(12) United States Patent
Kitamura et al.

(10) Patent No.: US 10,279,336 B2
(45) Date of Patent: May 7, 2019

(54) METHOD FOR USING TITANIUM OXIDE GRANULES TO RECOVER REINFORCING MATERIAL FROM REINFORCED PLASTIC

(71) Applicant: Rapas Corporation, Shiga (JP)

(72) Inventors: Keiko Kitamura, Shiga (JP); Itsushi Kashimoto, Shiga (JP); Masahiro Nishimura, Shiga (JP)

(73) Assignee: RAPAS CORPORATION, Shiga (JP)

( * ) Notice: Subject to any disclaimer, the term of this patent is extended or adjusted under 35 U.S.C. 154(b) by 128 days.

(21) Appl. No.: 15/306,764

(22) PCT Filed: Mar. 25, 2015

(86) PCT No.: PCT/JP2015/059028
§ 371 (c)(1),
(2) Date: Jan. 3, 2017

(87) PCT Pub. No.: WO2015/147021
PCT Pub. Date: Oct. 1, 2015

(65) Prior Publication Data
US 2017/0106351 A1    Apr. 20, 2017

(30) Foreign Application Priority Data

Mar. 27, 2014  (JP) .................................. 2014-065649

(51) Int. Cl.
*B01J 21/06*       (2006.01)
*B29B 17/00*       (2006.01)
(Continued)

(52) U.S. Cl.
CPC ............. *B01J 21/063* (2013.01); *B01J 23/72* (2013.01); *B01J 35/0006* (2013.01); *B01J 35/08* (2013.01);
(Continued)

(58) Field of Classification Search
CPC ...... B01J 21/063; B01J 23/72; B01J 35/0006; B01J 35/08; B01J 35/1014; B01J 35/1038;
(Continued)

(56) References Cited

U.S. PATENT DOCUMENTS

2007/0249887 A1    10/2007  Kitamura et al.
2008/0246181 A1*   10/2008  Zhu .................... B82Y 30/00
                                                    264/239

(Continued)

FOREIGN PATENT DOCUMENTS

EP    2177279 A1    4/2010
JP    S52-88265 A   7/1977
(Continued)

OTHER PUBLICATIONS

International Search Report issued in corresponding International Patent Application No. PCT/JP2015/059028 dated Jul. 21, 2015 (English translation) (2 pages).
(Continued)

*Primary Examiner* — Frances Tischler
(74) *Attorney, Agent, or Firm* — Kilyk & Bowersox, P.L.L.C.

(57) ABSTRACT

Waste treatment and recycling of a carbon fiber-reinforced plastic and a glass fiber-reinforced plastic are difficult owing to their excellent characteristics. The present invention has been completed on the basis of the finding that a reinforcing material can be recovered with high efficiency by bringing heated titanium oxide granules into contact with a reinforced plastic.

16 Claims, 5 Drawing Sheets

(51) Int. Cl.

| | | |
|---|---|---|
| C01G 23/053 | (2006.01) | |
| C08J 11/16 | (2006.01) | |
| B29B 17/02 | (2006.01) | |
| C01G 41/02 | (2006.01) | |
| C01G 3/02 | (2006.01) | |
| B01J 23/72 | (2006.01) | |
| B01J 35/00 | (2006.01) | |
| B01J 35/08 | (2006.01) | |
| B01J 35/10 | (2006.01) | |
| C01G 23/047 | (2006.01) | |
| C03C 13/00 | (2006.01) | |
| D01F 9/12 | (2006.01) | |
| B09B 3/00 | (2006.01) | |
| B29K 105/06 | (2006.01) | |
| B29K 307/04 | (2006.01) | |
| B29K 309/08 | (2006.01) | |
| B29K 105/12 | (2006.01) | |

(52) U.S. Cl.
CPC ....... *B01J 35/1014* (2013.01); *B01J 35/1038* (2013.01); *B01J 35/1042* (2013.01); *B09B 3/00* (2013.01); *B29B 17/00* (2013.01); *B29B 17/02* (2013.01); *C01G 3/02* (2013.01); *C01G 23/047* (2013.01); *C01G 23/053* (2013.01); *C01G 41/02* (2013.01); *C03C 13/00* (2013.01); *C08J 11/16* (2013.01); *D01F 9/12* (2013.01); *B29B 2017/0255* (2013.01); *B29K 2105/06* (2013.01); *B29K 2105/12* (2013.01); *B29K 2307/04* (2013.01); *B29K 2309/08* (2013.01); *C01P 2004/32* (2013.01); *C01P 2004/50* (2013.01); *C01P 2004/51* (2013.01); *C01P 2004/60* (2013.01); *C01P 2004/82* (2013.01); *C01P 2004/84* (2013.01); *C01P 2006/11* (2013.01); *C01P 2006/12* (2013.01); *C01P 2006/14* (2013.01); *C03C 2213/00* (2013.01); *Y02W 30/622* (2015.05); *Y02W 30/705* (2015.05)

(58) Field of Classification Search
CPC .................. B01J 35/1042; B29B 17/02; B29B 2017/0255; B29K 2105/12; B29K 2307/04; B29K 2309/08; C01G 23/047; C01P 2004/32; C01P 2004/51; C01P 2004/60; C01P 2006/11; C01P 2006/12; C01P 2006/14; C03C 2213/00; D01F 9/12

See application file for complete search history.

(56) References Cited

U.S. PATENT DOCUMENTS

| | | |
|---|---|---|
| 2011/0178358 A1 | 7/2011 | Kashimoto |
| 2014/0316018 A1 | 10/2014 | Shimizu et al. |

FOREIGN PATENT DOCUMENTS

| | | |
|---|---|---|
| JP | 2005-139440 A | 6/2005 |
| JP | 2005-307007 A | 11/2005 |
| JP | 2009-270123 A | 11/2009 |
| JP | 2012-211223 A | 11/2012 |
| JP | 2013-146649 A | 8/2013 |
| JP | 2014-177523 A | 9/2014 |
| WO | 2009004801 A1 | 1/2009 |
| WO | 2013089222 A1 | 6/2013 |

OTHER PUBLICATIONS

International Preliminary Report on Patentability and Written Opinion issued in corresponding International Patent Application No. PCT/JP2015/059028 dated Sep. 27, 2016 (English translation) (9 pages).

Office Action issued in corresponding Japanese Patent Application No. 2016-510405 dated Sep. 5, 2016—English translation (6 pages).

Extended European Search Report issued in corresponding European Patent Application No. 15 768 800.3 dated Oct. 17, 2017 (4 pages).

\* cited by examiner

A SAMPLE BEFORE TREATMENT (SAMPLE B)

ENLARGED PHOTOGRAPH OF ENCIRCLED PORTION

B SAMPLE AFTER TREATMENT

ENLARGED PHOTOGRAPH OF ENCIRCLED PORTION

Fig.3

A – 1 SAMPLE BEFORE TREATMENT (SAMPLE B)

B – 1 SAMPLE AFTER TREATMENT

≪BEFORE TREATMENT:1000 TIMES≫

≪AFTER TREATMENT:1000 TIMES≫

A – 2

B – 2

≪BEFORE TREATMENT:3000 TIMES≫

≪AFTER TREATMENT:3000 TIMES≫

METHOD FOR USING TITANIUM OXIDE GRANULES TO RECOVER REINFORCING MATERIAL FROM REINFORCED PLASTIC

TECHNICAL FIELD

The present invention relates to a method of recovering a reinforcing material from a reinforced plastic through use of titanium oxide granules, and more particularly, to a method of recovering carbon fiber from a carbon fiber-reinforced plastic through use of heated titanium oxide granules.

The present application is a National Stage Application of PCT/JP2015/059028, filed Mar. 25, 2015, which claims priority from Japanese Patent Application No. 2011-065649, which are incorporated herein by reference.

BACKGROUND ART

A reinforced plastic is a material obtained by incorporating fiber made of any of various materials into a plastic in order to compensate lack of strength and thermal resistance of the plastic. As the reinforced plastic, there are known, for example, a glass fiber-reinforced plastic {GFRP: the fiber (reinforcing material) is glass fiber}, a carbon fiber-reinforced plastic {CFRP: the fiber (reinforcing material) is carbon fiber}, a boron fiber-reinforced plastic {BFRP: the fiber (reinforcing material) is boron fiber}, and metal fiber {MFRP: the fiber (reinforcing material) is metal fiber}.

The carbon fiber-reinforced plastic is utilized for aerospace materials, sporting goods (golf, tennis rackets), and the like because of its excellent characteristics, such as tensile modulus of elasticity.

The glass fiber-reinforced plastic is utilized for building materials and the like because of its characteristics, such as incombustibility and thermal resistance.

Meanwhile, there is a problem in that waste treatment and recycling of the carbon fiber-reinforced plastic and the glass fiber-reinforced plastic are difficult owing to their excellent characteristics.

In order to solve the problem, the following patent applications have been reported.

In Patent Literature 1, there is a disclosure of a "recovery method for reclaimed carbon fiber, characterized in that when a carbon fiber-reinforced plastic is subjected to carbonization treatment in a carbonization furnace to recover reclaimed carbon fiber, a ground product containing the carbon fiber-reinforced plastic at a maximum diameter of 20 mm or less is placed in the carbonization furnace so as to have a layer thickness of 300 mm or less, and while an inert gas is introduced at from 10 times/minute to 100 times/minute with respect to an internal volume of the furnace, the carbonization treatment is performed under a furnace pressure of from 0.3 mmH$_2$O to 1.0 mmH$_2$O at a treatment temperature of from 400° C. to 950° C."

However, the recovery method disclosed in Patent Literature 1, in which the carbonization treatment is performed, is obviously different from a recovery method of the present application.

In Patent Literature 2, there is a disclosure of a "recovery method for carbon fiber in a carbon fiber-reinforced plastic, including pressurizing and heating a mixture of a carbon fiber-reinforced plastic with tetralin or decalin under a non-oxidizing gas atmosphere to decompose and remove a resin in the carbon fiber-reinforced plastic."

However, the recovery method disclosed in Patent Literature 2, in which the mixture with tetralin or decalin is used, is obviously different from the recovery method of the present application.

In Patent Literature 3, there is a disclosure of a "method of recovering glass fiber from a fiber-reinforced plastic, characterized by bringing a fiber-reinforced plastic including glass fiber and a polymer arranged to cover the glass fiber into contact with semiconductor powder at 100° C. or more in the presence of oxygen to remove the polymer through oxidative decomposition, to thereby recover the glass fiber."

However, $Cr_2O_3$ powder is the only semiconductor powder that has been actually demonstrated to enable recovery of the glass fiber. In addition, there is also a mention of titanium oxide, but only powder titanium oxide is applicable.

In recent years, there have been proposed various methods of treating and recycling plastic waste, and further, parts thereof have been practically employed. As a potent one of such methods of treating plastic waste, there has been proposed an apparatus and method involving gasifying the plastic waste by heating chips of the plastic waste in the presence of a decomposition catalyst of titanium oxide known as a photocatalyst (see Patent Literatures 4 and 5).

In addition, various catalysts to be used in decomposition treatment of the plastic waste have been investigated (Patent Literatures 6 to 11).

CITATION LIST

Patent Literature

[PTL 1] JP 2005-307121 A
[PTL 2] JP 2004-091719 A
[PTL 3] JP 2012-211223 A
[PTL 4] JP 2002-363337 A
[PTL 5] JP 2004-182837 A
[PTL 6] JP 2005-066433 A
[PTL 7] JP 2005-205312 A
[PTL 8] JP 2005-307007 A
[PTL 9] WO 2007/122967 A1
[PTL 10] WO 2010/021122 A1
[PTL 11] WO 2013/089222 A1

SUMMARY OF INVENTION

Technical Problem

There is a problem in that waste treatment and recycling of a carbon fiber-reinforced plastic and a glass fiber-reinforced plastic are difficult owing to their excellent characteristics.

Solution to Problem

The inventors of the present invention have made extensive investigations in order to solve the above-mentioned problem, and as a result, have found that a reinforcing material can be recovered with high efficiency by bringing heated titanium oxide granules into contact with a reinforced plastic. Thus, the inventors have completed the present invention.

That is, the present invention is as described below.

1. A recovery method for a reinforcing material, including bringing heated titanium oxide granules into contact with a reinforced plastic.

2. A recovery method according to the above-mentioned item 1, in which the contact includes stirring the reinforced plastic together with the heated titanium oxide granules.

3. A recovery method according to the above-mentioned item 1 or 2, in which a heating temperature of the heated titanium oxide granules falls within a range of from 300° C. to 600° C.

4. A recovery method according to any one of the above-mentioned items 1 to 3, in which the reinforced plastic includes a carbon fiber-reinforced plastic, and the reinforcing material includes carbon fiber.

5. A recovery method according to any one of the above-mentioned items 1 to 3, in which the reinforced plastic includes a glass fiber-reinforced plastic, and the reinforcing material includes glass fiber.

6. A recovery method according to any one of the above-mentioned items 1 to 5, in which the titanium oxide granules have the following characteristics:

(1) the granules each have a substantially spherical shape; and (2) granules each having a particle diameter of from 0.2 mm to 1.0 mm account for 70% or more of all the granules.

7. A recovery method according to the above-mentioned item 6, in which the characteristic "the granules each have a substantially spherical shape" includes the following characteristics:

(1) an angle at which a granule first starts sliding is from 0.5° to 15.0°; and (2) an angle at which all the granules finish sliding is from 2.0° to 30.0°.

8. A recovery method according to any one of the above-mentioned items 1 to 7, in which the granules each have a specific surface area in a range of from 30 $m^2/g$ to 70 $m^2/g$.

9. A recovery method according to any one of the above-mentioned items 1 to 8, in which the granules each have a tap density in a range of from 1.00 g/mL to 1.80 g/mL.

10. A recovery method according to any one of the above-mentioned items 1 to 9, in which the granules each have a pore volume in a range of from 0.10 cc/g to 0.60 cc/g.

11. A recovery method according to any one of the above-mentioned items 1 to 10, in which the titanium oxide granules have the following characteristic (1):

(1) the titanium oxide granules include titanium oxide granules obtained by drying a sol of titanium oxide to produce a titanium oxide gel, calcining the titanium oxide gel at a temperature in a range of from 450° C. to 850° C., and crushing the calcined product, followed by edge treatment, include particles each having a particle diameter of from 0.5 mm to 1.18 mm at a ratio in a range of from 50 wt % to 95 wt %, and each have a wear ratio of 2.0% or less.

12. A recovery method according to any one of the above-mentioned items 1 to 5, in which the titanium oxide granules have the following characteristic (1) or (2):

(1) a particle size distribution in the following range:

titanium oxide granules each having a particle size of 1.4 mm or more account for from 0 wt % to 1.0 wt %;

titanium oxide granules each having a particle size of from 1.0 mm to 1.4 mm account for from 0 wt % to 10.0 wt %;

titanium oxide granules each having a particle size of from 0.6 mm to 1.0 mm account for from 10 wt % to 60.0 wt %;

titanium oxide granules each having a particle size of from 0.3 mm to 0.6 mm account for from 10 wt % to 60.0 wt %;

titanium oxide granules each having a particle size of from 0.125 mm to 0.3 mm account for from 0 wt % to 30.0 wt %; and titanium oxide granules each having a particle size of 0.125 mm or less account for from 0 wt % to 30.0 wt %; or (2) a particle size distribution in the following range:

titanium oxide granules each having a particle size of 1.4 mm or more account for 0 wt %;

titanium oxide granules each having a particle size of from 1.0 mm to 1.4 mm account for from 0 wt % to 2.0 wt %;

titanium oxide granules each having a particle size of from 0.6 mm to 1.0 mm account for from 27 wt % to 60.0 wt %;

titanium oxide granules each having a particle size of from 0.3 mm to 0.6 mm account for from 30 wt % to 55.0 wt %;

titanium oxide granules each having a particle size of from 0.125 mm to 0.3 mm account for from 0 wt % to 20.0 wt %; and titanium oxide granules each having a particle size of 0.125 mm or less account for from 0 wt % to 25.0 wt %.

13. A recovery method according to anyone of the above-mentioned items 1 to 5, in which the titanium oxide granules have the following characteristic:

(1) a particle size distribution in the following range:

titanium oxide granules each having a particle size of 1.2 mm or more account for from 1 wt % to 50 wt %;

titanium oxide granules each having a particle size of from 0.5 mm to 1.2 mm account for from 40 wt % to 90 wt %; and titanium oxide granules each having a particle size of 0.5 mm or less account for from 1 wt % to 20 wt %.

14. A recovery method according to anyone of the above-mentioned item 1 to 13, in which the titanium oxide granules have copper oxide or copper supported thereon.

15. A recovery method according to the above-mentioned item 14, in which an amount of the copper oxide to be supported is from 0.5 wt % to 5.0 wt % in terms of copper oxide.

Advantageous Effects of Invention

The method of recovering a reinforcing material from a reinforced plastic through use of titanium oxide granules according to the present invention, in particular, the method of recovering carbon fiber from a carbon fiber-reinforced plastic through use of titanium oxide granules has the following remarkable effects as compared to a related-art recovery method:

(1) having high recovery efficiency;

(2) allowing recovery within a short period of time;

(3) allowing the reinforcing material to be recovered in a state of long fiber or woven fabric;

(4) generating little exhaust gas along with recovery;

(5) providing a high purity of the recovered reinforcing material; and (6) causing no damage or little damage to the surface of the recovered reinforcing material.

DESCRIPTION OF EMBODIMENTS

The Present Invention

The present invention relates to a "recovery method for a reinforcing material, including bringing heated titanium oxide granules into contact with a reinforced plastic." In particular, the present invention relates to a "method of recovering carbon fiber from a carbon fiber-reinforced plastic through use of heated titanium oxide granules." The details are described below.

(Reinforced Plastic)

The "reinforced plastic" to be used in the present invention is not particularly limited, and examples thereof may include a glass fiber-reinforced plastic {GFRP: its fiber (reinforcing material) is glass fiber}, a carbon fiber-reinforced plastic {CFRP: its fiber (reinforcing material) is carbon fiber}, a boron fiber-reinforced plastic {BFRP: its fiber (reinforcing material) is boron fiber}, and metal fiber {MFRP: its fiber (reinforcing material) is metal fiber}. Of those, a carbon fiber-reinforced plastic and a glass fiber-reinforced plastic are preferred, and a carbon fiber-reinforced plastic is more preferred.

(Carbon Fiber-Reinforced Plastic)

The "carbon fiber-reinforced plastic" to be used in the present invention is a material obtained by incorporating carbon fiber into a plastic.

Such plastic as a matrix resin is not particularly limited, and examples thereof may include thermosetting resins (e.g., an epoxy resin, a phenol resin, an unsaturated polyester resin, and a vinyl ester resin) and thermoplastic resins (e.g., a polypropylene resin, a polyamide resin, a polyether ether ketone resin, a polycarbonate resin, and polyphenylene sulfide).

The carbon fiber is not particularly limited, and examples thereof may include pitch yarn, rayon yarn, and acrylic yarn.

The carbon fiber-reinforced plastic is not particularly limited, and examples thereof may include a prepreg {a thermoplastic prepreg (product obtained by impregnating carbon fiber with a thermoplastic resin, such as acrylic, HTPE, PET, PP, nylon PA6, or PPS), or a carbon fiber opened yarn woven fabric prepreg}, and a semipreg (thermoplastic semipreg).

(Glass Fiber-Reinforced Plastic)

The "glass fiber-reinforced plastic" to be used in the present invention is a material obtained by incorporating glass fiber into a plastic.

The kind of the thermoplastic resin serving as a plastic as a matrix resin is not particularly limited. Examples thereof may include, but not particularly limited to, general plastics (e.g., a vinyl chloride resin, a heat-resistant vinyl chloride resin, polyethylene, polypropylene, polystyrene, an ABS resin, an AS resin, and polymethyl methacrylate), thermoplastic engineering plastics (e.g., polyamide, polyethylene terephthalate (PET), polyacetal, polycarbonate, modified polyphenylene oxide, polybutylene terephthalate (PBT), and ultra-high-molecular-weight polyethylene), and super engineering plastics {e.g., polysulfone, polyethersulfone, polyphenylene sulfide, polyarylate, polyetherimide, polyether ether ketone, polyimide, and polytetrafluoroethylene (a fluorine resin)}.

(Titanium Oxide Granules)

The "titanium oxide granules" of the present invention not only contain titanium oxide as an active component, but also may have copper and/or copper oxide supported thereon.

(Heating Temperature of Titanium Oxide Granules)

The "heating temperature of the titanium oxide granules" of the present invention at least needs to be 300° C. or more and 700° C. or less, and falls within the range of preferably 350° C. or more, particularly preferably from 420° C. to 560° C., still more preferably from 480° C. to 550° C., most preferably from 500° C. to 530° C.

The heating temperature is a temperature in a reaction tank for causing the titanium oxide granules and the reinforced plastic to react with each other, and refers to a set temperature for keeping the set temperature of the titanium oxide granules. That is, even when the set temperature is 480° C., the range of fluctuation of the temperature of the titanium oxide granules in the reaction tank is about ±30° C. with respect to the set temperature.

Further, at a certain position in the reaction tank, the temperature may become higher or lower than the particularly preferred "heating temperature of the titanium oxide granules" of the present invention depending on the shape and size of the reaction tank. However, it suffices that the preferred heating temperature is maintained in most part of the titanium oxide granules.

In the recovery method of the present invention, through use of the titanium oxide granules under the optimal heating condition, the reinforcing material can be recovered with high efficiency. Further, the titanium oxide granules can be easily separated from components contained in the reinforced plastic except for the plastic (in particular, metals, inorganic substances, and the like mixed with the plastic).

Further, the recovery method of the present invention is not particularly limited as long as the heated titanium oxide granules can be brought into contact with the reinforced plastic. However, it is preferred that the titanium oxide granules and the reinforced plastic be stirred instead of being merely placed in the reaction container, left to stand still, and heated. A method of stirring the titanium oxide granules and the reinforced plastic is not particularly limited. A reaction container having introduced thereinto a stirrer may be used, and an apparatus configured such that the titanium oxide granules and the reinforced plastic can be circulated and stirred in the reaction container is preferably used.

The apparatus configured such that the titanium oxide granules and the reinforced plastic can be circulated and stirred in the reaction container may be exemplified by a decomposition apparatus disclosed in WO 2007/122967 A1 or WO 2009/051253 A1, but is not particularly limited thereto.

(Particle Diameter of Each of Titanium Oxide Granules)

The titanium oxide granules to be used in the recovery method of the present invention each have a "particle diameter" of from 0.20 mm to 1.2 mm, preferably from 0.30 mm to 1.0 mm, more preferably from 0.40 mm to 1.0 mm, most preferably from 0.40 mm to 0.80 mm.

More specifically, granules each having a particle diameter of from 0.20 mm to 1.2 mm, preferably from 0.3 mm to 1.0 mm, more preferably from 0.40 mm to 1.0 mm, most preferably from 0.40 mm to 0.80 mm account for 70% or more, preferably 80% or more, more preferably 90% or more of all the titanium oxide granules before use.

In addition, the main distribution of the particle diameters of titanium oxide before use is from 0.4 mm to 0.6 mm, preferably about 0.50 mm.

Further, in order to decompose a reinforced plastic with which metals and inorganic substances, in particular, finely powdered metals of rare metals and the like are mixed, the "particle diameter" of each of the titanium oxide granules is from 0.4 mm to 1.0 mm, preferably from 0.5 mm to 0.8 mm, out of the above-mentioned ranges.

When titanium oxide granules having large particle diameters are used, the recovery ratio of finely powdered metals and inorganic substances mixed with the reinforced plastic can be increased.

For the particle diameters in the above-mentioned ranges, reference may be made to the contents disclosed in WO 2010/021122 A1.

In addition, the titanium oxide granules to be used in the recovery method of the present invention may have "particle diameters" in the following ranges:

titanium oxide granules each having a particle diameter of 1.4 mm or more account for from 0 wt % to 1.0 wt %;
titanium oxide granules each having a particle diameter of from 1.0 mm to 1.4 mm account for from 0 wt % to 10.0 wt %;
titanium oxide granules each having a particle diameter of from 0.6 mm to 1.0 mm account for from 10 wt % to 60.0 wt %;
titanium oxide granules each having a particle diameter of from 0.3 mm to 0.6 mm account for from 10 wt % to 60.0 wt %;
titanium oxide granules each having a particle diameter of from 0.125 mm to 0.3 mm account for from 0 wt % to 30.0 wt %; and
titanium oxide granules each having a particle diameter of 0.125 mm or less account for from 0 wt % to 30.0 wt %.

More specifically, the titanium oxide granules have a particle size distribution in the following range:

titanium oxide granules each having a particle size of 1.4 mm or more account for 0 wt %;
titanium oxide granules each having a particle size of from 1.0 mm to 1.4 mm account for from 0 wt % to 2.0 wt %;
titanium oxide granules each having a particle size of from 0.6 mm to 1.0 mm account for from 27 wt % to 60.0 wt %;
titanium oxide granules each having a particle size of from 0.3 mm to 0.6 mm account for from 30 wt % to 55.0 wt %;
titanium oxide granules each having a particle size of from 0.125 mm to 0.3 mm account for from 0 wt % to 20.0 wt %; and
titanium oxide granules each having a particle size of 0.125 mm or less account for from 0 wt % to 25.0 wt %.

The particle diameters in the above-mentioned ranges have already been found in Example 1 of the present invention.

In addition, the titanium oxide granules to be used in the recovery method of the present invention may have "particle diameters" in the following ranges:

titanium oxide granules each having a particle diameter of 1.2 mm or more account for from 1 wt % to 50 wt %;
titanium oxide granules each having a particle diameter of from 0.5 mm to 1.2 mm account for from 40 wt % to 90 wt %; and
titanium oxide granules each having a particle diameter of 0.5 mm or less account for from 1 wt % to 20 wt %.

For the particle diameters in the above-mentioned ranges, reference may be made to the contents disclosed in JP 4848479 B2.

(Titanium Oxide Granules Each have Substantially Spherical Shape)

The phrase "the granules each have a substantially spherical shape" in the present invention means that the surface of each of the granules (particles) is rounded off and the degree of spherical shape in particle shape is higher as compared to the shape of related-art titanium oxide.

As indicators for showing that the degree of spherical shape in particle shape is higher, there are given, for example, a "circularity", a "slant angle for rolling of granules (particles)", and a "rest angle".

For the details, reference may be made to WO 2013/089222 A1.

A "method of measuring a circularity" of the present invention may be carried out under the following condition and with the following apparatus.

(Condition)

A CCD camera is fixed to an inverted microscope, and the processing of images is performed with Image-Pro Plus. Specifically, titanium oxide granules are placed in a plastic petri dish so that the granules do not overlap with each other, images are taken into the inverted microscope described below at a magnification of four times, and the circularity of each granule is automatically measured by using Image-Pro Plus.

(Apparatus)

Microscope: inverted microscope TMD-300, Nippon Kogaku K.K. (Nikon Corporation), CCD camera: Nippon Roper K.K., Retiga 2000R (1,600×1,200 pixels)

Image processing apparatus: Nippon Roper K.K., Image-Pro Plus

The "circularity" of each of the titanium oxide granules to be used in the recovery method of the present invention is from 1.00 to 2.00, preferably from 1.00 to 1.50, more preferably from 1.00 to 1.40, still more preferably from 1.00 to 1.30, most preferably from 1.00 to 1.20.

More specifically, titanium oxide granules each having a circularity of from 1.00 to 2.00, preferably from 1.00 to 1.50, more preferably from 1.00 to 1.40, still more preferably from 1.00 to 1.30, most preferably from 1.00 to 1.20 account for 70% or more, preferably 80% or more, more preferably 90% or more of all the titanium oxide granules before use.

The "slant angle for rolling of granules" of the present invention may be measured under the following conditions.

20 g of titanium oxide granules are placed on a glass plate, and the angle of the glass plate is changed from horizontal (0°) to slanted, to thereby measure (1) an angle at which a titanium oxide granule first starts sliding and (2) an angle at which all granules finish sliding.

The values of the "slant angle for rolling of granules" of the titanium oxide granules to be used in the recovery method of the present invention are as described below.

(1) The angle at which a granule first starts sliding is from 0.5° to 15.0°, preferably from 0.5° to 10.0°, more preferably from 0.5° to 8.0°, most preferably from 0.5° to 5.0°.

(2) The angle at which all granules finish sliding is from 2.0° to 30.0°, preferably from 2.0° to 25.0°, more preferably from 2.0° to 22.0°, most preferably from 2.0° to 18.0°.

The "rest angle" of the present invention may be measured by the following method.

20 g of unused titanium oxide granules are dropped with a funnel to form a mountain-like layer, and the angle between the slant of the layer and the horizontal plane is measured. The rest angle of powders and granules having better flowability is smaller, and in contrast, the rest angle of powders and granules having worse flowability is larger.

The "rest angle" of the titanium oxide granules to be used in the recovery method of the present invention is from 15° to 35°, preferably from 20° to 35°.

In addition, a "tap density" is given as another indicator for showing characteristics of the titanium oxide granules to be used in the recovery method of the present invention.

In the present invention, the tap density of the titanium oxide granules may be measured as described below.

About 180 g of titanium oxide granules are loaded into a 200 mL graduated cylinder made of glass, and the graduated cylinder is naturally dropped repeatedly ten times from the 50 mm-high position on a rubber sheet having a thickness of 10 mm. After that, the graduated cylinder is hit to a side of a wooden plate ten times from a 50 mm-distant position. Then, the above-mentioned operations are repeated two times. After that, the scale of the graduated cylinder is read to define the resultant value as the volume V (mL) of the granules. Different granules are dried at 110° C. for 3 hours, and then the weight M (g) of the resultant granules is measured. On the basis of the values, the tap density is calculated from the expression M/V.

The "tap density" of the titanium oxide granules to be used in the recovery method of the present invention is from 1.00 g/mL to 1.80 g/mL, preferably from 1.03 g/mL to 1.60 g/mL, more preferably from 1.05 g/mL to 1.40 g/mL.

In addition, a "wear ratio" is given as still another indicator for showing characteristics of the titanium oxide granules to be used in the recovery method of the present invention.

The wear ratio of the titanium oxide granules of the present invention may be measured by the following method.

Figure 1:
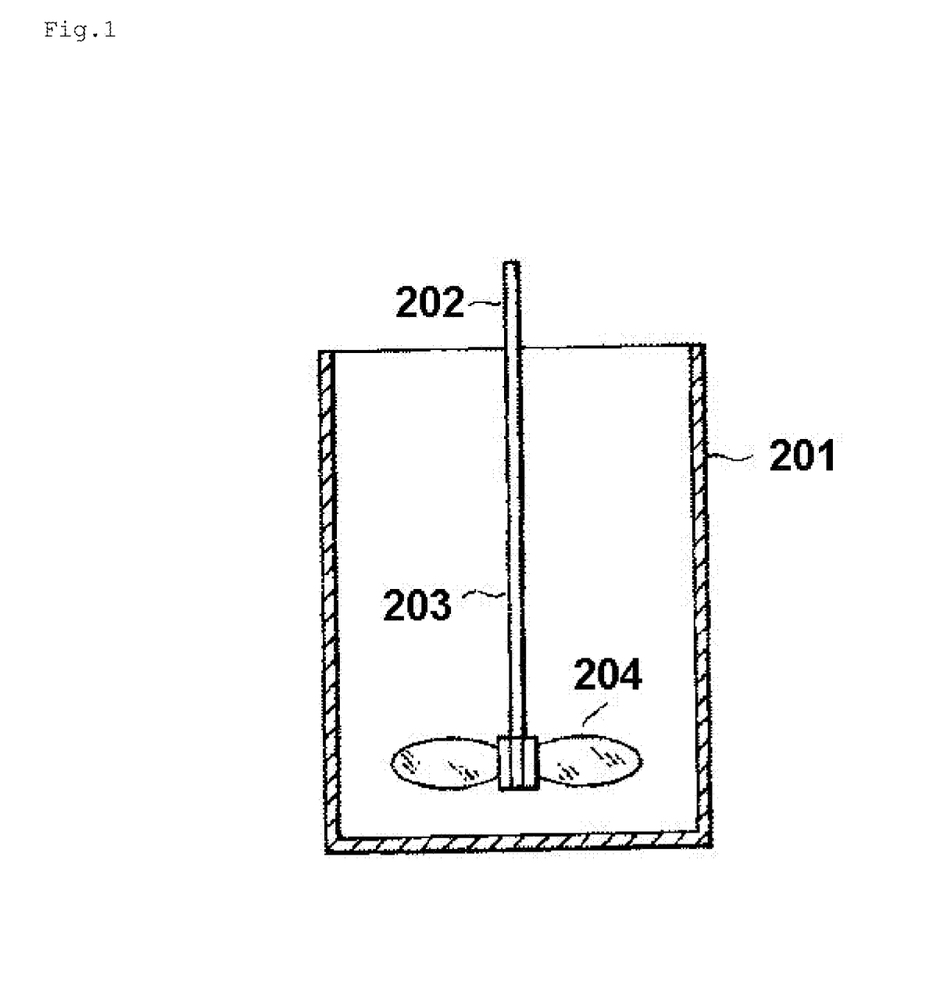
FIG. 1 is a view for illustrating an apparatus for measuring the wear ratio of titanium oxide granules.

The wear ratio is measured with a wear ratio measuring apparatus illustrated in FIG. 1. That is, the wear ratio measuring apparatus includes a sample container 201 having an inner diameter of 63 mm and a depth of 86 mm and a stirrer 202 fixed to the sample container, and the stirrer 202 includes a shaft 203 and three oval stirring blades 204 each having a length of 20 mm fixed to the lower end part of the shaft so as to extend at a 60° interval in the diameter direction from the shaft, with each of the stirring blades slanted so as to have an angle of 45° with respect to the horizontal plane. Each of the stirring blades is positioned so that the distance from its lowest edge to the bottom of the sample container is 8 mm.

When the wear ratio of the titanium oxide granules is measured, 150 mL of the titanium oxide granules are weighed with a 200 mL graduated cylinder, and the resultant weight is recorded. After that, all the titanium oxide granules weighed are fed into the sample container and are stirred by using the stirrer described above at 300 rpm for 30 minutes. Then, the sample is taken out of the sample container and the whole is transferred onto a sieve having a mesh size of 0.5 mm. A sample passing through the sieve is weighed. Here, when the weight of the sample passing through the sieve having a mesh size of 0.5 mm is defined as W and the weight of the sample subjected to the measurement is defined as $W_0$, the wear ratio A of the sample is calculated according to $A=(W/W_0)\times100(\%)$.

The "wear ratio" of the titanium oxide granules to be used in the recovery method of the present invention is 2.0 wt % or less, preferably 1.5 wt % or less, more preferably 1.0 wt % or less.

In addition, a "specific surface area" is given as still another indicator for showing characteristics of the titanium oxide granules to be used in the recovery method of the present invention.

The specific surface area of the titanium oxide granules of the present invention may be measured by the following method.

A BET method is used to carry out measurement in the present invention. The details of the measurement are as described below.

The BET method is a method involving causing molecules whose adsorption occupancy area is known to adsorb onto the surfaces of powder particles at a temperature of liquid nitrogen and determining the specific surface area of a sample on the basis of the adsorption amount.

In the present invention, a 2300-model automatic measurement apparatus (Shimadzu Corporation, manufacturer) is used as a specific surface area measurement apparatus.

The titanium oxide granules to be used in the recovery method of the present invention each have a "specific surface area" of 30 $m^2$/g or more, preferably from 33 $m^2$/g to 80 $m^2$/g, more preferably from 35 $m^2$/g to 70 $m^2$/g.

Further, the specific surface area of the titanium oxide granules before use is from 30 $m^2$/g to 70 $m^2$/g.

As the specific surface area becomes larger, the contact surfaces between the granules and the reinforced plastic become larger, and hence recovery efficiency can be enhanced. However, when the specific surface area is too large, the thermal resistance of the granules becomes weak and the granules are liable to collapse and to turn to powder.

In addition, in each of the "titanium oxide granules" of the present invention, the pore volume of titanium oxide serving as an active component is from 0.05 ml/g to 1.00 ml/g, preferably from 0.07 ml/g to 0.80 ml/g, more preferably from 0.10 ml/g to 0.60 ml/g.

A method known per se may be used as a method of measuring the pore volume of the titanium oxide granules. In the present invention, a mercury intrusion method is used for the measurement. The details thereof are as described below.

The mercury intrusion method is a method involving applying pressure so as to cause mercury to penetrate into pores of powders by taking advantage of the large surface tension of mercury and determining a pore volume on the basis of the value of the pressure and the amount of mercury intruded.

In the present invention, a porosimeter (mercury intrusion type, highest pressure: 200 MPa) manufactured by Thermo Finnigan Inc. was used.

In addition, in the present invention, the titanium oxide granules include titanium oxide granules obtained by drying a sol of titanium oxide to produce a titanium oxide gel, calcining the titanium oxide gel at a temperature in the range of from 450° C. to 850° C., and crushing the calcined product, followed by edge treatment, include particles each having a particle diameter of from 0.5 mm to 1.18 mm at a ratio in the range of from 50 wt % to 95 wt %, and each have a wear ratio of 2.0% or less.

For the details, reference may be made to JP 2005-307007 A.

In the present invention, the titanium oxide granules described above may have copper oxide or copper supported thereon. The amount of copper oxide to be supported is not particularly limited, but is preferably from 0.5 wt % to 5.0 wt % in terms of copper oxide.

For the details, reference may be made to WO 2013/089222 A1.

The "titanium oxide granules" or "titanium oxide granules having copper oxide or copper supported thereon" of the present invention allow the reinforcing material to be recovered with high efficiency over a long period of time, by virtue of having the above-mentioned characteristics.

Further, in the "titanium oxide granules" of the present invention, the distribution of particle diameters of the titanium oxide granules is narrower than the distribution of particle diameters of the related-art titanium oxide. Thus, by using a sieve having a larger mesh size and a sieve having a smaller mesh size than the particle distribution of the titanium oxide granules, the granules and foreign matter (metals, inorganic substances, and the like mixed with a reinforced plastic) can be easily separated.

(Production Method for Titanium Oxide Granules)

A "production method for the titanium oxide granules" of the present invention involves subjecting a titania sol (also including, as necessary, at least one kind of sol selected from a silica sol, an alumina sol, and a zirconia sol) to stirring granulation to yield granules each having a spherical shape, followed preferably by calcination at a temperature in the range of from 400° C. to 850° C. Then, sieving is performed to yield calcined granules each having a specific particle diameter.

The stirring granulation may utilize a method known per se, and the following granulation is preferred: a liquid binder (the above-mentioned sol in the present invention) is stirred, and a shearing effect due to a high-speed stirring blade yields consolidated aggregates of the above-mentioned powder.

Further, the following granulation may be adopted: powder of an inorganic oxide and a liquid binder (the above-mentioned sol in the present invention) are stirred, and the aggregation of the powder due to the sol and a shearing effect due to a high-speed stirring blade yield consolidated aggregates of the above-mentioned powder.

Depending on the amount of the sol, the number of rotations of the stirring blade, a granulation time, and the like, the consolidation degree and size of each of the resultant aggregated granules may be arbitrarily adjusted. In addition, through appropriate selection of a base plate in a granulation container in a stirring granulation apparatus, the shape of each of the resultant aggregates may be made closer to a sphere.

In the present invention, a granulator for the stirring granulation is not particularly limited. For example, there are preferably used a mixer granulator NMG series manufactured by Nara Machinery Co., Ltd., a high-speed mixer and HIGH FLEX GRAL manufactured by Fukae Powtec Co., Ltd., an Eirich intensive mixer (Eirich reverse-flow type high-speed mixer) manufactured by Nippon Eirich Co., Ltd., a high-speed stirring granulator HSG series manufactured by G-Labo, Inc., a kneader/high-speed stirring granulator SPG series and a high-speed mixer/grinder spartan granulator manufactured by Dalton Co., Ltd., a vertical granulator VG-CT series manufactured by Powrex Corporation, and the like.

In order to further enhance the sphericalness of the granules obtained above and also to make the particle size distribution of the granules more precise, the granules obtained by the stirring granulation may be additionally granulated in the presence of the sol by at least one kind of method selected from tumbling granulation and fluidized-bed granulation.

In the granulation, in order to make the resultant granules harder and further enhance the wear resistance of the granules, a mixture of a ground product of the inorganic oxide and a ground product obtained by drying and calcining the sol, followed by pulverization may be used together with the sol.

The tumbling granulation refers to, as already known well, a granulation method involving giving a tumbling motion to a mixture of powder and a liquid binder, to thereby yield aggregated granules. The fluidized-bed granulation refers to, as also already known well, a granulation method involving supplying a liquid binder into a fluidized bed of powder and causing the formation of bridges between particles owing to the binder, to thereby yield aggregated granules.

As mentioned above, the granules obtained by the stirring granulation are additionally granulated by at least one kind of method selected from the tumbling granulation and the fluidized-bed granulation, and then the granules obtained are, as described above, calcined at a temperature in a range of from 400° C. to 850° C., followed by sieving, to thereby collect particles each having a particle diameter in a range of from 0.1 mm to 1.2 mm (or from 0.1 mm to 1.4 mm). As a result, granules each having a necessary particle size can be obtained.

A tumbling granulator and a fluidized-bed granulator (combined granulator) for the granulation mentioned above are not particularly limited as well in the present invention. Examples thereof may include a fluidized-bed granulation apparatus "NEW/MARUMERIZER" and a spheronizer "MARUMERIZER" manufactured by Dalton Co., Ltd., and a fluidized-bed granulation apparatus and a tumbling/fluidizing coating apparatus "Multiplex" series manufactured by Powrex Corporation.

(Apparatus to be Used in Recovery Method of the Present Invention)

A decomposition apparatus for plastics and organic substances known per se may be utilized as an apparatus to be used in the recovery method of the present invention. In particular, the titanium oxide granules to be used in the recovery method of the present invention exhibit very high recovery efficiency. Accordingly, it is preferred to use a catalyst-circulating decomposition apparatus for plastic and organic waste, the apparatus being high in efficiency in the contact of the granules with the reinforced plastic, rather than a related-art batch-type decomposition apparatus. The catalyst-circulating decomposition apparatus for plastic and organic waste is disclosed in WO 2007/122967 A1 or WO 2009/051253 A1.

Further, the above-mentioned decomposition apparatus includes oxidation catalyst treatment means and/or reduction catalyst treatment means, and further includes preferably lime neutralization treatment means.

In addition, the decomposition apparatus to be used in the recovery method of the present invention may include any one or more means selected from the following:

(1) alumina catalyst treatment means;
(2) means for grinding reinforced plastic;
(3) carrier gas supply means;
(4) means for collecting scattered metals, inorganic substances, and/or catalysts discharged from a reaction tank for means for treating reinforced plastic;

(5) cyclone dust collection means (first dust collection means);
(6) dust collection means with a bag filter (second dust collection means);
(7) heat exchange means;
(8) preheater means;
(9) exhaust blower means;
(10) cooling means;
(11) heat recovery means;
(12) hydrogen chloride continuous measurement means;
(13) CO continuous measurement means;
(14) alarm means; and
(15) oxidation catalyst treatment means and/or reduction catalyst treatment means.

The number of rotations of the stirring of the titanium oxide granules and the reinforced plastic is from 5 rpm to 70 rpm, preferably from 10 rpm to 60 rpm, though the number of rotations varies depending on the volume of a reaction container, the shape of a stirring blade, and a stirring method. Regardless of whether the reaction container adopts a batch system or a circulation system, the same number of rotations is preferred.

Those values are ones set by considering the fact that when the number of rotations is too large, the titanium oxide granules wear to a large extent, but when the number of rotations is small, the efficiency in the contact of the titanium oxide granules with the reinforced plastic becomes lower.

The present invention is described below byway of Examples, but the present invention is by no means limited to Examples.

Example 1

(Production of Titanium Oxide Granules to be Used in Recovery Method for Reinforcing Material of the Present Invention)

Titanium oxide granules to be used in the present invention were produced by a plurality of methods described below. The details are as described below.

(1) Titanium Oxide Granules 1

In a titanium oxide production process using a sulfuric acid method, a slurry of titanium hydroxide obtained through a hydrolysis step was filtered and washed with water, followed by repulping, to thereby yield Slurry A. Nitric acid was added as a solating agent to Slurry A to yield Sol B of titanium oxide. Further, part of Sol B was heated to 100° C. and dried to produce a dried gel. The dried gel was calcined at 500° C. for 3 hours in an electrical furnace to yield Calcined titanium oxide C.

Calcined titanium oxide C was ground and the resultant ground product was granulated while a 5-fold dilution of Sol B diluted with water was being sprayed, by using a high-speed stirring granulator, model SPG-25, manufactured by Dalton Co., Ltd. under the conditions of 250 rpm for a stirring blade and 3,000 rpm for a high-speed chopper, to thereby yield titanium oxide particles.

The titanium oxide particles were dried at 100° C. for 3 hours and were then calcined at 600° C., followed by sieving with a sieve having a mesh size of 1.19 mm and a sieve having a mesh size of 0.104 mm, to thereby yield granules each having a particle diameter of from 0.1 mm to 1.2 mm. The weight of the granules was defined as 100 wt %.

In the present invention, the phrase "granules each having a particle diameter of from 0.1 mm to 1.2 mm" refers to granules obtained by sieving granules by using a 15-mesh standard sieve made of stainless steel wire mesh (wire diameter: 0.5 mm, mesh size: 1.19 mm) and a 150-mesh standard sieve made of stainless steel wire mesh (wire diameter: 0.065 mm, mesh size: 0.104 mm), that is, granules passing through the 15-mesh standard sieve and remaining on the 150-mesh standard sieve.

Specifically, the granules each having a particle diameter of from 0.1 mm to 1.2 mm were obtained in the following manner. That is, the 15-mesh standard sieve was fixed to the upper lid of a Ro-Tap standard sieve shaker manufactured by Yoshida Seisakusho Co., Ltd. and the 150-mesh standard sieve was fixed to the lower tray of the sieve shaker. Then, 100 g of titanium oxide granules were supplied as a sample on the 15-mesh standard sieve, and were subjected to sieving for 3 minutes with shaking rotation at 300 rpm and the number of striking at 150 times/minute, to thereby yield granules passing through the 15-mesh standard sieve and remaining on the 150-mesh standard sieve as the granules each having a particle diameter of from 0.1 mm to 1.2 mm.

The titanium oxide granules obtained above had a BET specific surface area of 60 $m^2/g$, a pore volume measured by a mercury intrusion method of 0.15 mL (cc)/g, a tap density of 1.16 g/mL, and a wear ratio of 0.3%.

(2) Titanium Oxide Granules 2

Slurry A of titanium hydroxide obtained in the section (1) was heated at 100° C. and dried to produce a dried gel. The dried gel was calcined at 500° C. for 3 hours in an electrical furnace and was then subjected to grinding treatment to yield a ground product of Calcined titanium oxide D. 50 Parts by weight of the ground product of Calcined titanium oxide D and 50 parts by weight of the ground product of Calcined titanium oxide C were mixed.

The mixture of 50 parts by weight of the ground product of Calcined titanium oxide D and 50 parts by weight of the ground product of Calcined titanium oxide C was treated in the same manner as in the section (1). The resultant particles were dried, calcined, and sieved to yield granules each having a particle diameter of from 0.1 mm to 1.2 mm.

The titanium oxide granules obtained above had a specific surface area of 62 $m^2/g$, a pore volume of 0.28 mL (cc)/g, a tap density of 1.06 g/mL, and a wear ratio of 1.0%.

(3) Titanium Oxide Granules 3

The titanium oxide granules obtained in the section (1) were further granulated so as to have a more spherical shape by spraying the ground product of Titanium oxide C obtained in the section (1) and a 4-fold dilution of Sol B diluted with water by using a tumbling granulator "MARUMERIZER". The resultant particles were treated in the same manner as in the section (1) to yield granules each having a particle diameter in the range of from 0.1 mm to 1.2 mm.

The titanium oxide granules obtained above had a specific surface area of 59 $m^2/g$, a pore volume of 0.17 mL (cc)/g, a tap density of 1.18 g/mL, and a wear ratio of 0.3%.

(4) Titanium Oxide Granules 4

Sol B of titanium oxide obtained in the section (1) and ammonium tungstate were mixed. The mixture was heated to 100° C. and dried to produce a dried gel. The dried gel was calcined at 500° C. for 3 hours in an electrical furnace to yield a calcined titanium-tungsten composite oxide (weight ratio of titanium oxide/tungsten oxide: 90:10).

Calcined titanium-tungsten composite oxide E thus obtained was ground to produce a ground product. The ground product was granulated while a 5-fold dilution of Sol B diluted with water was being sprayed, by using a high-speed stirring granulator, model SPG-25, manufactured by Dalton Co., Ltd. under the conditions of 250 rpm for a stirring blade and 3,000 rpm for a high-speed chopper, to thereby yield titanium-tungsten composite oxide granules.

Next, the granules were further granulated so as to have a more spherical shape by spraying the ground product of Calcined titanium-tungsten composite oxide E and a 4-fold dilution of Sol B diluted with water by using a spheronizer "MARUMERIZER". The resultant granules were treated in the same manner as in the section (1) to yield granules each having a particle diameter of from 0.1 mm to 1.2 mm.

The titanium oxide granules obtained above had a specific surface area of 69 $m^2$/g, a pore volume of 0.2 ml (cc)/g, a tap density of 1.20 g/ml, and a wear ratio of 0.5%.

(5) Particle Diameter of Each of Titanium Oxide Granules

Granules each having a particle diameter (twice a radius) in the range of from 0.2 mm to 1.0 mm, further, from 0.3 mm to 1.0 mm accounted for 70% or more of all the titanium oxide granules obtained above.

More specifically, the granules had particle diameters in the following ranges:

granules each having a particle diameter of 1.4 mm or more account for 0 wt %;

granules each having a particle diameter of from 1.0 mm to 1.4 mm account for from 0 wt % to 2.0 wt %;

granules each having a particle diameter of from 0.6 mm to 1.0 mm account for from 27 wt % to 60.0 wt %;

granules each having a particle diameter of from 0.3 mm to 0.6 mm account for from 30 wt % to 55.0 wt %;

granules each having a particle diameter of from 0.125 mm to 0.3 mm account for from 0 wt % to 20.0 wt %; and granules each having a particle diameter of 0.125 mm or less account for from 0 wt % to 25.0 wt %.

(6) Circularity of Each of Titanium Oxide Granules

Granules each having a circularity in the range of from 1.00 to 1.50, further, from 1.00 to 1.30 accounted for 70% or more of all the titanium oxide granules obtained above.

(7) Measurement of Slant Angle for Rolling of Titanium Oxide Granules

The angle at which the titanium oxide granules obtained above first started sliding was from 1.5° to 2.5°.

The angle at which all the titanium oxide granules obtained above finished sliding was from 9.0° to 10.0°.

Example 2

(Production of Titanium Oxide Granules Having Copper Oxide Supported Thereon to be Used in Recovery Method for Reinforcing Material of the Present Invention)

Titanium oxide granules having copper oxide supported thereon to be used in the present invention were produced by a plurality of methods described below. The details of the methods are as described below.

(1) Titanium Oxide Granules 1 Having Copper Oxide Supported Thereon

In a titanium oxide production process using a sulfuric acid method, a slurry of titanium hydroxide obtained through a hydrolysis step was filtered and washed with water, followed by repulping, to thereby yield Slurry A. Nitric acid was added as a solating agent to Slurry A to yield Sol B of titanium oxide. Further, part of Sol B was heated to 100° C. and dried to produce a dried gel. The dried gel was calcined at 500° C. for 3 hours in an electrical furnace to yield Calcined titanium oxide C.

Calcined titanium oxide C was ground and the resultant ground product was granulated while a 5-fold dilution of Sol B diluted with water was being sprayed, by using a high-speed stirring granulator, model SPG-25, manufactured by Dalton Co., Ltd. under the conditions of 250 rpm for a stirring blade and 3,000 rpm for a high-speed chopper, to thereby yield titanium oxide particles.

The titanium oxide particles were dried at 100° C. for 3 hours and were then calcined at 600° C., followed by sieving with a sieve having a mesh size of 1.19 mm and a sieve having a mesh size of 0.104 ram, to thereby yield granules each having a particle diameter of from 0.1 mm to 1.2 mm. The weight of the granules was defined as 100 wt %.

In the present invention, the phrase "granules each having a particle diameter of from 0.1 mm to 1.2 mm" refers to granules obtained by sieving granules by using a 15-mesh standard sieve made of stainless steel wire mesh (wire diameter: 0.5 mm, mesh size: 1.19 mm) and a 150-mesh standard sieve made of stainless steel wire mesh (wire diameter: 0.065 mm, mesh size: 0.104 mm), that is, granules passing through the 15-mesh standard sieve and remaining on the 150-mesh standard sieve.

Specifically, the granules each having a particle diameter of from 0.1 mm to 1.2 mm were obtained in the following manner. That is, the 15-mesh standard sieve was fixed to the upper lid of a Ro-Tap standard sieve shaker manufactured by Yoshida Seisakusho Co., Ltd. and the 150-mesh standard sieve was fixed to the lower tray of the sieve shaker. Then, 100 g of titanium oxide granules were supplied as a sample on the 15-mesh standard sieve, and were subjected to sieving for 3 minutes with shaking rotation at 300 rpm and the number of striking at 150 times/minute, to thereby yield granules passing through the 15-mesh standard sieve and remaining on the 150-mesh standard sieve as the granules each having a particle diameter of from 0.1 mm to 1.2 mm.

Finally, the granules were immersed into an aqueous solution containing varying concentrations of copper nitrate, followed by drying and then calcination at 500° C., to thereby yield titanium oxide granules having 1 wt % CuO, 3 wt % CuO, or 5 wt % CuO supported thereon. The amount of copper oxide supported was confirmed by means of fluorescent X-rays.

(2) Titanium Oxide Granules 2 Having Copper Oxide Supported Thereon

Slurry A of titanium hydroxide obtained in the section (1) was heated at 100° C. and dried to produce a dried gel. The dried gel was calcined at 500° C. for 3 hours in an electrical furnace and was then subjected to grinding treatment to yield a ground product of Calcined titanium oxide D. 50 Parts by weight of the ground product of Calcined titanium oxide D and 50 parts by weight of the ground product of Calcined titanium oxide C were mixed.

The mixture of 50 parts by weight of the ground product of Calcined titanium oxide D and 50 parts by weight the ground product of Calcined titanium oxide C was treated in the same manner as in the section (1). The resultant particles were dried, calcined, and sieved to yield granules each having a particle diameter of from 0.1 mm to 1.2 mm.

Finally, the granules were immersed into an aqueous solution containing varying concentrations of copper nitrate, followed by drying and then calcination at 500° C., to thereby yield titanium oxide granules having 1 wt % CuO, 3 wt % CuO, or 5 wt % CuO supported thereon. The amount of copper oxide supported was confirmed by means of fluorescent X-rays.

(3) Titanium Oxide Granules 3 Having Copper Oxide Supported Thereon

The titanium oxide granules obtained in the section (1) were further granulated so as to have a more spherical shape by spraying the ground product of Titanium oxide C and a 4-fold dilution of Sol B diluted with water by using a tumbling granulator "MARUMERIZER". The resultant particles were treated in the same manner as in the section (1) to yield granules each having a particle diameter of from 0.1 mm to 1.2 mm.

Finally, the granules were immersed into an aqueous solution containing varying concentrations of copper nitrate, followed by drying and then calcination at 500° C., to thereby yield titanium oxide granules having 1 wt % CuO, 3 wt % CuO, or 5 wt % CuO supported thereon. The amount of copper oxide supported was confirmed by means of fluorescent X-rays.

(4) Titanium Oxide Granules 4 Having Copper Oxide Supported Thereon

Sol B of titanium oxide obtained in the section (1) and ammonium tungstate were mixed. The mixture was heated at 100° C. and dried to produce a dried gel. The dried gel was calcined at 500° C. for 3 hours in an electrical furnace to yield a calcined titanium-tungsten composite oxide (weight ratio of titanium oxide to tungsten oxide: 90:10).

Calcined titanium-tungsten composite oxide E thus obtained was ground to produce a ground product. The ground product was granulated while a 5-fold dilution of Sol B diluted with water was being sprayed, by using a high-speed stirring granulator, model SPG-25, manufactured by Dalton Co., Ltd. under the conditions of 250 rpm for a stirring blade and 3,000 rpm for a high-speed chopper, to thereby yield titanium-tungsten composite oxide granules.

Next, the granules were further granulated so as to have a more spherical shape by spraying the ground product of Calcined titanium-tungsten composite oxide E and a 4-fold dilution of Sol B diluted with water by using a spheronizer "MARUMERIZER". The resultant granules were treated in the same manner as in the section (1) to yield granules each having a particle diameter of from 0.1 mm to 1.2 mm.

Finally, the granules were immersed into an aqueous solution containing varying concentrations of copper nitrate, followed by drying and then calcination at 500° C., to thereby yield titanium-tungsten composite oxide granules having 1 wt % CuO, 3 wt % CuO, or 5 wt % CuO supported thereon. The amount of copper oxide supported was confirmed by means of fluorescent X-rays.

It was confirmed that all the characteristics of the titanium oxide granules 1 to 4 having copper oxide supported thereon fell within the following ranges.

Specific surface area measured by a BET method: 30 m$^2$/g to 70 m$^2$/g

Pore volume measured by a mercury intrusion method: 0.20 cc/g to 0.60 cc/g

Tap density: 1.00 g/mL to 1.80 g/mL

Wear ratio: 2.0 wt % or less

Angle at which a granule first starts sliding: 0.5° to 15.0°

Angle at which all the granules finish sliding: 2.0° to 30.0°

Circularity: 1.00 to 2.00

Rest angle: 15° to 35°

Example 3

(Recovery of Carbon Fiber from Carbon Fiber-Reinforced Plastic Through Use of Titanium Oxide Granules)

In this Example, carbon fiber was recovered from a carbon fiber-reinforced plastic. Further, the characteristics of the recovered carbon fiber were investigated.

The details of various conditions, an apparatus and samples used, and the like are as described below.

(Apparatus and Samples Used)

1. Experimental apparatus (reaction container): compact stirrer-type decomposition experimental apparatus
   (volume of reaction container: 2,200 mL)
2. Reinforced plastic (commercially available product)
   Sample A 310 g/m$^2$ CF 65%: PA6 35% t=0.48 mm (semipreg)
   Sample B 480 g/m$^2$ CF 64%: PA6 36% t=0.59 mm (semipreg)

Samples A and B were each cut into a square shape (woven fabric shape) of 2 cm×2 cm, stuck in wire mesh and fixed to a stirring blade so as to prevent carbon fiber (CF) after treatment from scattering, and subjected to recovery treatment.

3. Titanium oxide granules used: titanium oxide granules 1 of Example 1

(Conditions for Recovery of Carbon Fiber)
1. Amount of titanium oxide granules: 800 g
2. Reaction time: 5 min
3. Supply air amount: 30 l/min
4. Exhaust amount: 124 l/min (inverter setting: 30 Hz)
5. Lime pellet: 700 g
6. Reduction catalyst inlet temperature: 200° C.
7. Oxidation catalyst inlet temperature: 450° C.
8. Decomposition tank titanium temperature: 490° C.
9. Decomposition tank stirring number: 30 rpm (Conditions for Analysis of Exhaust Gas Generated During Recovery of Carbon Fiber)
1. Supply air amount: 10 l/min
2. Exhaust amount: 30 l/min (inverter setting: 10 Hz)
3. Decomposition tank stirring number: 60 rpm
4. Sample input amount: 1.0 g/time n=3

(Results of Recovery of Reinforcing Material from Reinforced Plastic)

A ratio between the weight of an inorganic substance residue after recovery treatment and the weight before recovery treatment was defined as a "residue (CF) ratio".

A ratio between the residue (CF) ratio and the CF weight ratio of Sample A or B described in a product catalog was defined as a "CF recovery ratio".

The residue (CF) ratio and the CF recovery ratio are shown in Table 1 below.

TABLE 1

| Treatment time | Sample | Weight before treatment | Weight of residue (CF) after treatment | Residue (CF) ratio | Catalog value for CF content | CF recovery ratio |
|---|---|---|---|---|---|---|
| 5 minutes | A | 0.1192 g | 0.0765 g | 64.2% | 65% | 98.8% |
|  | B | 0.1837 g | 0.1175 g | 64.0% | 64% | 100% |

As apparent from Table 1 above, the recovery ratios of the reinforcing materials (carbon fiber) for Sample A and Sample B were 98.8% and 100%, respectively. Those recovery ratios were obtained within short periods of time and were high recovery ratios as compared to those in a hitherto reported recovery method.

Figure 2:
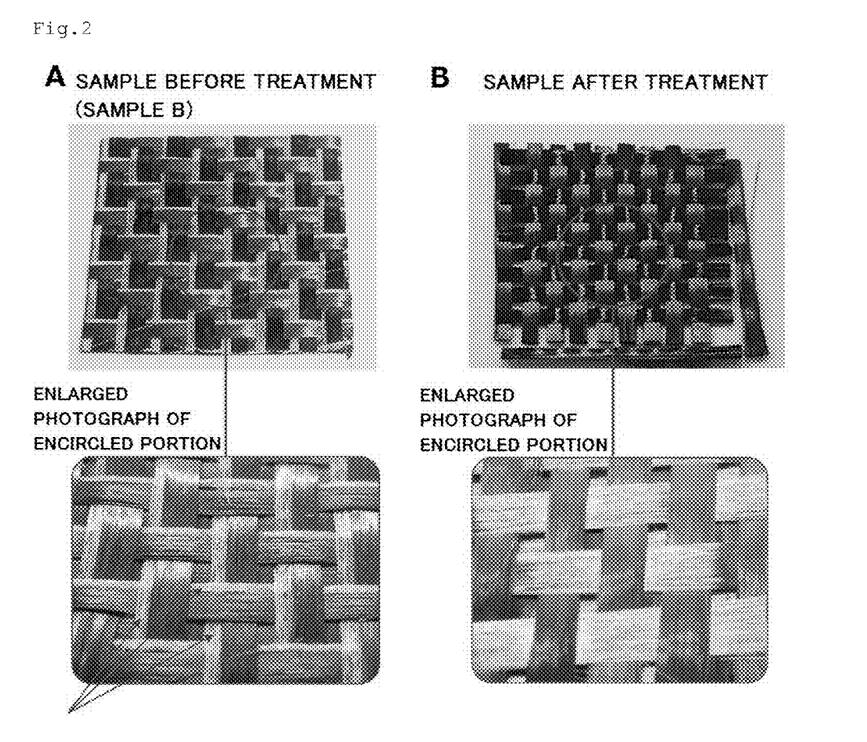
FIG. 2 are photographs of a carbon fiber-reinforced plastic before recovery treatment and after recovery treatment (state of woven fabric). Arrows each indicate a "nylon resin".
Figure 3:
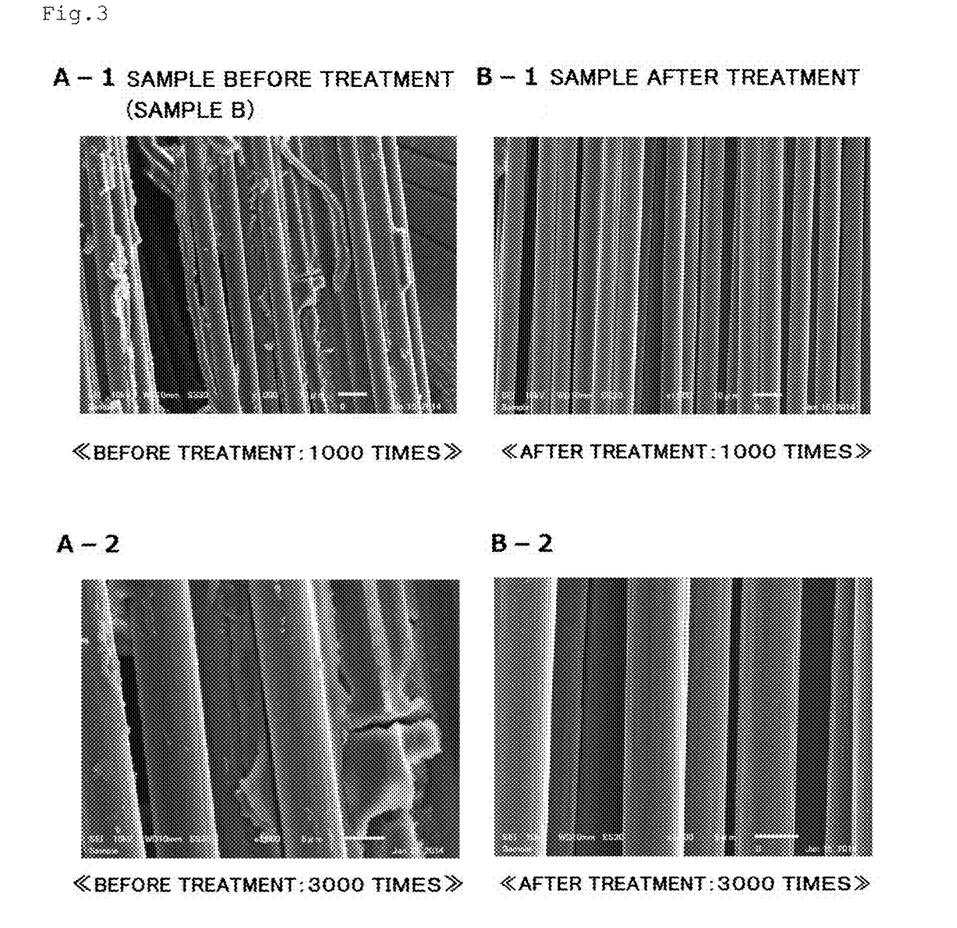
FIG. 3 are electron micrographs of carbon fiber-reinforced plastics before recovery treatment and after recovery treatment (state of woven fabric).

Entire views of Sample B before recovery treatment and after recovery treatment from the decomposition tank (after contact with the titanium oxide granules) are shown in FIG. 2 and electron micrographs thereof are shown in FIG. 3.

As apparent from FIG. 2A, in Sample B before treatment, a state in which thin carbon fiber was bundled in a plate shape with a resin and the whole was knitted with a nylon resin (arrows) was able to be observed.

As apparent from FIG. 2B, in Sample B after recovery from the decomposition tank, it was able to be confirmed that the resin content was completely decomposed and the carbon fiber having a plate shape was brought into a state of independent pieces of fiber like hairs. Further, it was able to be confirmed that the nylon resin portion was also decomposed. In addition, the carbon fiber was able to be recovered in a state of woven fabric.

As apparent from FIG. 3A-1 (1,000 times), it can be confirmed that a resin is present between carbon fiber and carbon fiber, and on the surface of carbon fiber as well. Further, as apparent from FIG. 3A-2 (3,000 times), it is found that the entire surface of the carbon fiber is coated with the resin. Besides, it can be confirmed that carbon fiber and carbon fiber are bound by the resin.

As apparent from FIG. 3B-1 (1,000 times), it was able to be confirmed that the resin that had been present between carbon fiber and carbon fiber, and on the surface of carbon fiber was completely removed. Further, as apparent from FIG. 3B-2 (3,000 times), it was able to be confirmed that the resin with which the surface of the carbon fiber had been coated was completely decomposed as well as the resin between carbon fibers. Further, it was able to be confirmed that the surface of the carbon fiber was very smooth and clean.

Exhaust gas to be generated during the recovery of carbon fiber was continuously collected with an exhaust gas analyzer (PG250) to find out the safety of the exhaust gas and a decomposition time.

It was found that in the recovery treatment (decomposition treatment), decomposition was completed in about 3 minutes. In addition, 30 seconds after loading of the carbon fiber-reinforced plastic, a peak of $CO_2$ generation appeared, and thus it was found that the decomposition treatment had been carried out.

As exhaust gas components, CO generation was hardly detected, and the concentrations of $CH_4$ and $NO_x$ were also low.

Further, in the same manner as above, carbon fiber was also recovered from long fiber serving as a prepreg product.

Figure 4:
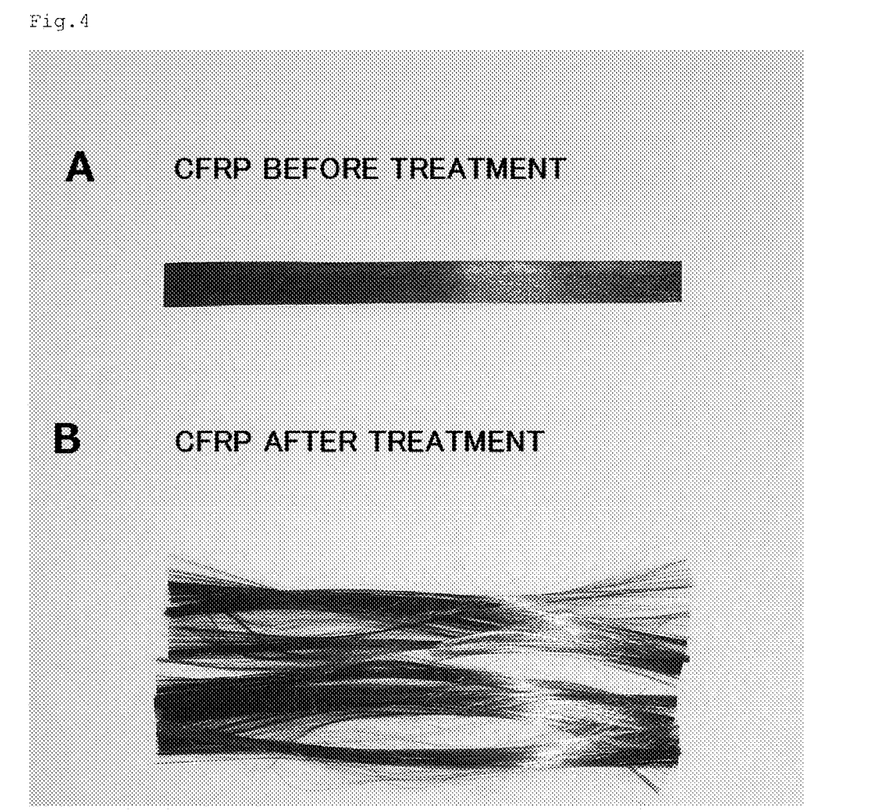
FIG. 4 are photographs of a carbon fiber-reinforced plastic before recovery treatment and after recovery treatment (state of long fiber).

As apparent from FIG. 4, it was confirmed that the carbon fiber was able to be recovered in a state of long fiber from Sample B after treatment.

Example 4

(Recovery of Carbon Fiber from Carbon Fiber-Reinforced Plastic Through Use of Titanium Oxide Granules Having Copper Oxide Supported Thereon)

In this Example, in the same manner as in Example 3, carbon fiber was recovered from a carbon fiber-reinforced plastic through use of titanium oxide granules having copper oxide supported thereon (titanium oxide granules 1 having copper oxide supported thereon of Example 2).

As in Example 3, carbon fiber was able to be recovered within a short period of time and with a high recovery ratio.

Example 5

(Recovery of Glass Fiber from Glass Fiber-Reinforced Plastic)

In this Example, in the same manner as in Example 3, glass fiber was recovered from a glass fiber-reinforced plastic through use of titanium oxide granules.

As in Example 3, glass fiber was able to be recovered within a short period of time and with a high recovery ratio.

Example 6

(Recovery of Carbon Fiber from Carbon Fiber-Reinforced Plastic after Thermal Curing Treatment Through Use of Titanium Oxide Granules)

In this Example, carbon fiber was recovered from a carbon fiber-reinforced plastic after thermal curing treatment. Further, the characteristics of the recovered carbon fiber were investigated.

Samples each used as a carbon fiber-reinforced plastic are as follows: Sample A: prepreg cured product (sheet shape) after thermal curing treatment; Sample B: carbon shaft cured product (pipe shape) after thermal curing treatment; and Sample C: carbon shaft crushed product obtained by crushing a carbon shaft cured product after thermal curing treatment.

The details of various conditions, an apparatus and samples used, and the like are as described below.

(Apparatus and Samples Used)

1. Experimental apparatus (reaction container): compact stirrer-type decomposition experimental apparatus
   (volume of reaction container: about 2,330 mL, φ150 mm, height: 132 mm)
2. Reinforced plastic (commercially available product)
   Sample A 1.2 g (prepreg cured product)
   Sample B 2.5 g (carbon shaft cured product)
   Sample C 1.1 g (carbon shaft crushed product)
   Sample A was divided into 0.4 g portions and treated three times. The resultant was stuck in wire mesh and fixed to a stirring blade so as to prevent carbon fiber (CF) after treatment from scattering, and subjected to recovery treatment.
   In order to subject Sample B to decomposition treatment while keeping its pipe shape, wire mesh formed into a cylindrical shape was fixed to each of the inside and outside of the sample having a pipe shape, and the resultant was fixed to a stirring blade and subjected to recovery treatment.
   Sample C was directly loaded into the decomposition tank in an amount of 1.1 g, and a state of its decomposition along the passage of time was observed.
3. Titanium oxide granules used: titanium oxide granules 1 of Example 1

(Conditions for Recovery of Carbon Fiber)
1. Amount of titanium oxide granules: 800 g
2. Reaction time: 10 min (Samples A and B) 7 min (Sample C)
3. Supply air amount: 20 l/min
4. Exhaust amount: 48 l/min (inverter setting: 15 Hz)
5. Lime pellet: 700 g
6. Reduction catalyst inlet temperature: 200° C.
7. Oxidation catalyst inlet temperature: 450° C.
8. Decomposition tank titanium temperature: 550° C.
9. Decomposition tank stirring number: 60 rpm (Results of Recovery of Reinforcing Material from Reinforced Plastic after Thermal Curing Treatment)

It was found that the recovery ratios were obtained within short periods of time and were high recovery ratios as in Example 3.

Figure 5:
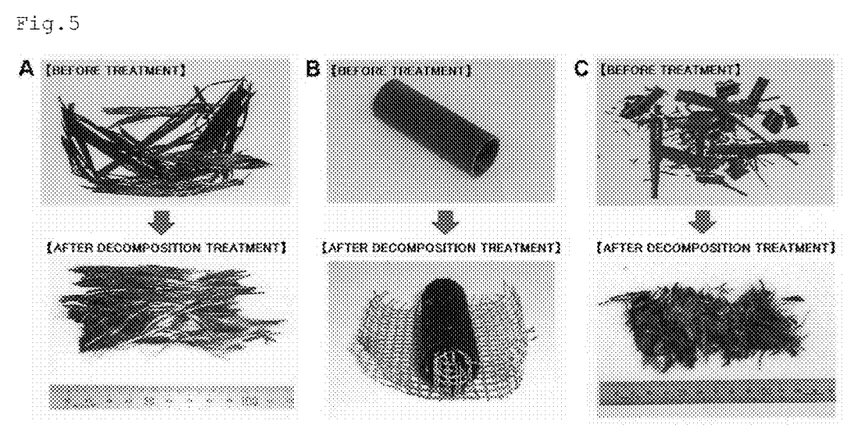
FIG. 5 are photographs of carbon fiber-reinforced plastics after thermal curing treatment before recovery treatment and after recovery treatment. A: Even in the case of a cured sample after thermal curing treatment, as in the case of an uncured sample, only flexible carbon fiber was able to be recovered while maintaining a state of long fiber. B: Through use of a jig (wire mesh), carbon fiber was able to be recovered while maintaining a pipe shape. C: Carbon fiber was able to be recovered as short fiber from a crushed sample.

Entire views of Samples A, B, and C before recovery treatment and after recovery treatment from the decomposition tank (after contact with the titanium oxide granules) are shown in FIG. 5.

As apparent from FIG. 5A, even in the case of the sample after thermal curing treatment, as in the case of an uncured sample, only flexible carbon fiber was able to be recovered while maintaining a state of long fiber. The recovered CF weighed 1.0 g. Through use of the wire mesh, CF was able to be recovered without being caused to scatter.

As apparent from FIG. 5B, flexible carbon fiber keeping a pipe shape was able to be recovered also from the sample having a pipe shape after thermal curing treatment.

As apparent from FIG. 5C, carbon fiber was able to be recovered as short fiber from the sample crushed after thermal curing treatment. The carbon shaft crushed product was directly loaded into the decomposition tank, and hence the state of its decomposition was able to be observed. After 2 minutes from loading, the bundled treated sample started to fall apart, and cotton-like CF started to fly. After 4 minutes, the hardness of the treated sample was lost, and the cotton-like CF scattered in a larger amount. From 4 minutes onward, the state of the treated sample did not change, and hence it was judged that the decomposition treatment had been completed. The treatment was ended 7 minutes after the loading of the treated sample. The scattered cotton-like CF was collected with mesh fixed to the exhaust port in the lid of the decomposition tank (not shown). The CF in the decomposition tank did not become cotton-like and kept the shape of linear fiber. The CF mixed with the titanium oxide catalyst was separated with a sieve and recovered. That part of the CF that passed through the mesh of the sieve was directly recovered from the titanium oxide catalyst with tweezers. The CF adhering to the inner wall surface of the decomposition tank was also recovered. The CF scattered during the recovery, and hence not the whole amount thereof was recovered. The CF recovered from the decomposition tank weighed 0.3 g, and the CF collected in the exhaust path weighed 0.2 g. Thus, 0.5 g of the CF was recovered in total. The results of the carbon shaft crushed product for which the state of decomposition was able to be observed reveal that CF can be recovered from finely crushed cured CFRP in a treatment time of from 4 minutes to 5 minutes.

(Overview)

On the basis of the above-mentioned recovery results, the following may be said about the recovery method of the present invention.

(1) A high recovery ratio is achieved within a short period of time as compared to those in the hitherto reported recovery method.

(2) In the hitherto reported recovery method, fiber is recovered as short fiber (chopped strand) in many cases. However, in the recovery method of the present invention, fiber can be recovered in a state of long fiber or woven fabric as well.

(3) CF of a sample after thermal curing treatment was able to be recovered without any problem.

(4) Even in the case of a carbon shaft sample having a pipe shape, CF was able to be recovered while maintaining a pipe shape through use of wire mesh. Thus, the recovery method of the present invention can be applied to other shapes.

(5) The purity of the recovered reinforcing material is very high as compared to that in the hitherto reported recovery method.

(6) The surface of the recovered reinforcing material is clean without any damage as compared to that in the hitherto reported recovery method.

(7) Little exhaust gas is generated along with recovery.

(8) The recovered reinforcing material (in particular, carbon fiber) has strength sufficient to allow recycling.

In view of the foregoing, the recovery method of the present invention is very promising for recycling business of reinforcing materials (in particular, carbon fiber) by virtue of the above-mentioned characteristics (1) to (8).

In addition, the inventors of the present invention have found from Examples of the present invention that related-art powder titanium oxide has the following problems.

(1) The related-art powder titanium oxide was very fine powder (for example, having a particle diameter of 7 nanometers) and difficult to handle. In particular, in order to recover a large amount of the reinforcing material, a large apparatus (in particular, large decomposition apparatus) needs to be used. However, the related-art powder titanium oxide scatters in the air when loaded into the apparatus. Accordingly, there was a need for a safety measure for preventing an operator from inhaling the powder titanium oxide. Further, there was a problem in that the scattering in the air reduced the amount of the powder titanium oxide that was actually usable.

(2) When air is fed or exhausted inside the apparatus, the related-art powder titanium oxide scatters, and hence is ejected to the outside through any gap of the apparatus. Accordingly, the blocking of a gap, hole, or the like necessary as an apparatus and the covering of its surface with its function maintained led to the complication of the apparatus.

(3) The related-art powder titanium oxide remains adhering to the surface of the reinforced plastic serving as a treatment object, resulting in a state in which the recovery of the reinforcing material is not promoted. Consequently, the reinforcing material cannot be recovered with high efficiency.

(4) In the recovery of an inorganic substance contained in the reinforced plastic, the powder titanium oxide is recovered together with the inorganic substance. Accordingly, it is difficult to recover only the inorganic substance.

(5) A mechanical treatment method (for example, for use as a reinforcement material for concrete after crushing) is not capable of recovery of only carbon fiber. Accordingly, its applications were limited.

(6) A thermal decomposition method involves treatment at a high temperature of from 700° C. to 800° C. Accordingly, carbon fiber was deteriorated in some cases.

(7) Depolymerization under ordinary pressure required long treatment time.

(8) A supercritical/subcritical fluid method had a problem with an increase in size of an apparatus.

Further, the inventors of the present invention have found from Examples of the present invention that it is the titanium oxide granules used in Examples of the present invention that can solve the above-mentioned problems of the related-art powder titanium oxide.

INDUSTRIAL APPLICABILITY

The recovery method of the present invention is very promising for recycling businesses of reinforcing materials (in particular, carbon fiber).

REFERENCE SIGNS LIST

201: sample container
202: stirrer
203: shaft
204: stirring blade

The invention claimed is:

1. A recovery method for recovering carbon fiber from a carbon fiber-reinforced plastic, wherein the carbon fiber is in the form of a fiber or woven fabric,
said method comprises bringing heated titanium oxide granules into contact with the carbon fiber-reinforced plastic and then recovering said carbon fiber.

2. The recovery method according to claim 1, wherein the contact comprises stirring the carbon fiber-reinforced plastic together with the heated titanium oxide granules.

3. The recovery method according to claim 1, wherein a heating temperature of the heated titanium oxide granules falls within a range of from 300° C. to 600° C.

4. The recovery method according to claim 1, wherein the carbon fiber is in the form of woven fabric.

5. The recovery method according to claim 1, wherein the titanium oxide granules have the following characteristics:
  (1) the granules each have a substantially spherical shape; and
  (2) granules each having a particle diameter of from 0.2 mm to 1.0 mm account for 70% or more of all the granules.

6. The recovery method according to claim 5, wherein the characteristic "the granules each have a substantially spherical shape" comprises the following characteristics:
  (1) an angle at which a granule first starts sliding is from 0.5° to 15.0°; and
  (2) an angle at which all the granules finish sliding is from 2.0° to 30.0°.

7. The recovery method according to claim 1, wherein the titanium oxide granules each have a specific surface area in a range of from 30 $m^2/g$ to 70 $m^2/g$.

8. The recovery method according to claim 1, wherein the titanium oxide granules each have a tap density in a range of from 1.00 g/mL to 1.80 g/mL.

9. The recovery method according to claim 1, wherein the titanium oxide granules each have a pore volume in a range of from 0.10 cc/g to 0.60 cc/g.

10. The recovery method according to claim 1, wherein the titanium oxide granules have the following characteristic:
  the titanium oxide granules include titanium oxide granules obtained by drying a sol of titanium oxide to produce a titanium oxide gel, calcining the titanium oxide gel at a temperature in a range of from 450° C. to 850° C., and crushing the calcined product, followed by edge treatment, include particles each having a particle diameter of from 0.5 mm to 1.18 mm at a ratio in a range of from 50 wt % to 95 wt %, and each have a wear ratio of 2.0% or less.

11. The recovery method according to claim 1, wherein the titanium oxide granules have the following characteristic (1) or (2):
  (1) a particle size distribution in the following range:
  titanium oxide granules each having a particle size of 1.4 mm or more account for from 0 wt % to 1.0 wt %;
  titanium oxide granules each having a particle size of from 1.0 mm to 1.4 mm account for from 0 wt % to 10.0 wt %;
  titanium oxide granules each having a particle size of from 0.6 mm to 1.0 mm account for from 10 wt % to 60.0 wt %;
  titanium oxide granules each having a particle size of from 0.3 mm to 0.6 mm account for from 10 wt % to 60.0 wt %;
  titanium oxide granules each having a particle size of from 0.125 mm to 0.3 mm account for from 0 wt % to 30.0 wt %; and
  titanium oxide granules each having a particle size of 0.125 mm or less account for from 0 wt % to 30.0 wt %; or
  (2) a particle size distribution in the following range:
  titanium oxide granules each having a particle size of 1.4 mm or more account for 0 wt %;
  titanium oxide granules each having a particle size of from 1.0 mm to 1.4 mm account for from 0 wt % to 2.0 wt %;
  titanium oxide granules each having a particle size of from 0.6 mm to 1.0 mm account for from 27 wt % to 60.0 wt %;
  titanium oxide granules each having a particle size of from 0.3 mm to 0.6 mm account for from 30 wt % to 55.0 wt %;
  titanium oxide granules each having a particle size of from 0.125 mm to 0.3 mm account for from 0 wt % to 20.0 wt %; and
  titanium oxide granules each having a particle size of 0.125 mm or less account for from 0 wt % to 25.0 wt %.

12. The recovery method according to claim 1, wherein the titanium oxide granules have the following characteristic:
  (1) a particle size distribution in the following range:
  titanium oxide granules each having a particle size of 1.2 mm or more account for from 1 wt % to 50 wt %;
  titanium oxide granules each having a particle size of from 0.5 mm to 1.2 mm account for from 40 wt % to 90 wt %; and
  titanium oxide granules each having a particle size of 0.5 mm or less account for from 1 wt % to 20 wt %.

13. The recovery method according to claim 1, wherein the titanium oxide granules have copper oxide or copper supported thereon.

14. The recovery method according to claim 13, wherein an amount of the copper oxide to be supported is from 0.5 wt % to 5.0 wt % in terms of copper oxide.

15. The recovery method according to claim 1, further comprising recovering the titanium oxide granules.

16. The recovery method according to claim 1, wherein the carbon fiber recovered in said recovering is in the substantial absence of the titanium oxide granules.

* * * * *